T. E. MURRAY & H. R. WOODROW.
ELECTRIC WELDING MACHINE.
APPLICATION FILED FEB. 19, 1917.

1,233,688.

Patented July 17, 1917.
3 SHEETS—SHEET 2.

INVENTORS
Thomas E. Murray
Harry R. Woodrow
BY
Their ATTORNEY

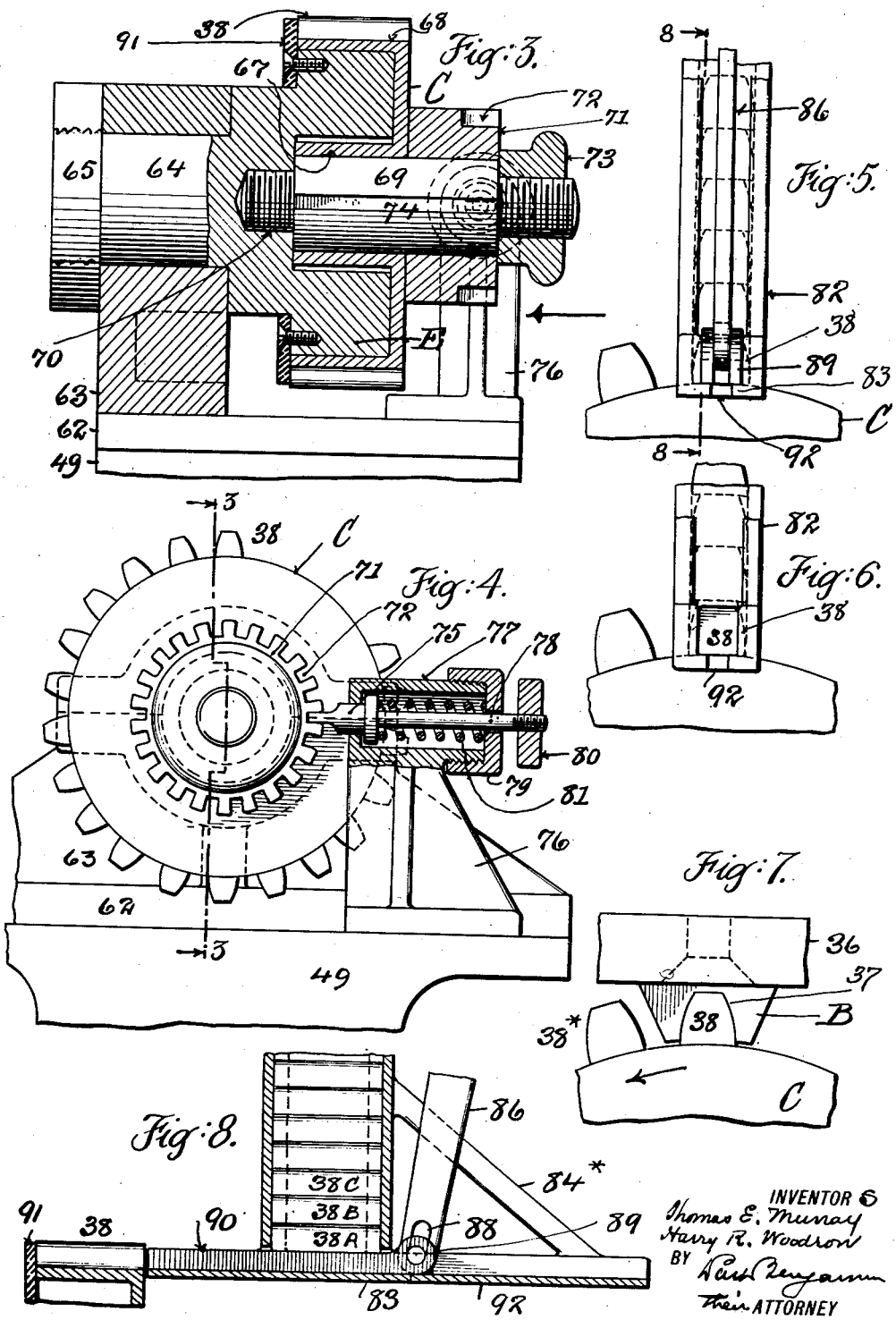

UNITED STATES PATENT OFFICE.

THOMAS E. MURRAY AND HARRY R. WOODROW, OF NEW YORK, N. Y.; SAID WOODROW ASSIGNOR TO SAID MURRAY.

ELECTRIC WELDING-MACHINE.

1,233,688.

Specification of Letters Patent.

Patented July 17, 1917.

Application filed February 19, 1917. Serial No. 149,498.

*To all whom it may concern:*

Be it known that we, THOMAS E. MURRAY and HARRY R. WOODROW, citizens of the United States, residing at New York, in the county of New York and State of New York, have invented a certain new and useful Improvement in Electric Welding-Machines, of which the following is a specification.

The invention is an apparatus for producing toothed gears by electrically welding the teeth to a supporting member. If a toothed rack is to be made, said supporting member will present a flat surface; if a pulley, said member will be a suitable disk or cylinder, to the circumferential periphery of which said teeth may be affixed. The machine here disclosed as an embodiment of our invention is designed for the electrical welding of teeth upon the rim of a pulley at certain predetermined intervals apart, and is so organized as that each tooth descending a chute upon a table or tray is moved therefrom upon the pulley rim. Said pulley is received upon a disk electrode. After the tooth is in place, a movable electrode is caused to descend upon said tooth to clamp it in position, and then the welding current is established. The disk electrode may be rotated over predetermined intervals so as to expose new places on the pulley rim for the attachment of the teeth thereto.

In the accompanying drawings—

Figure 1:
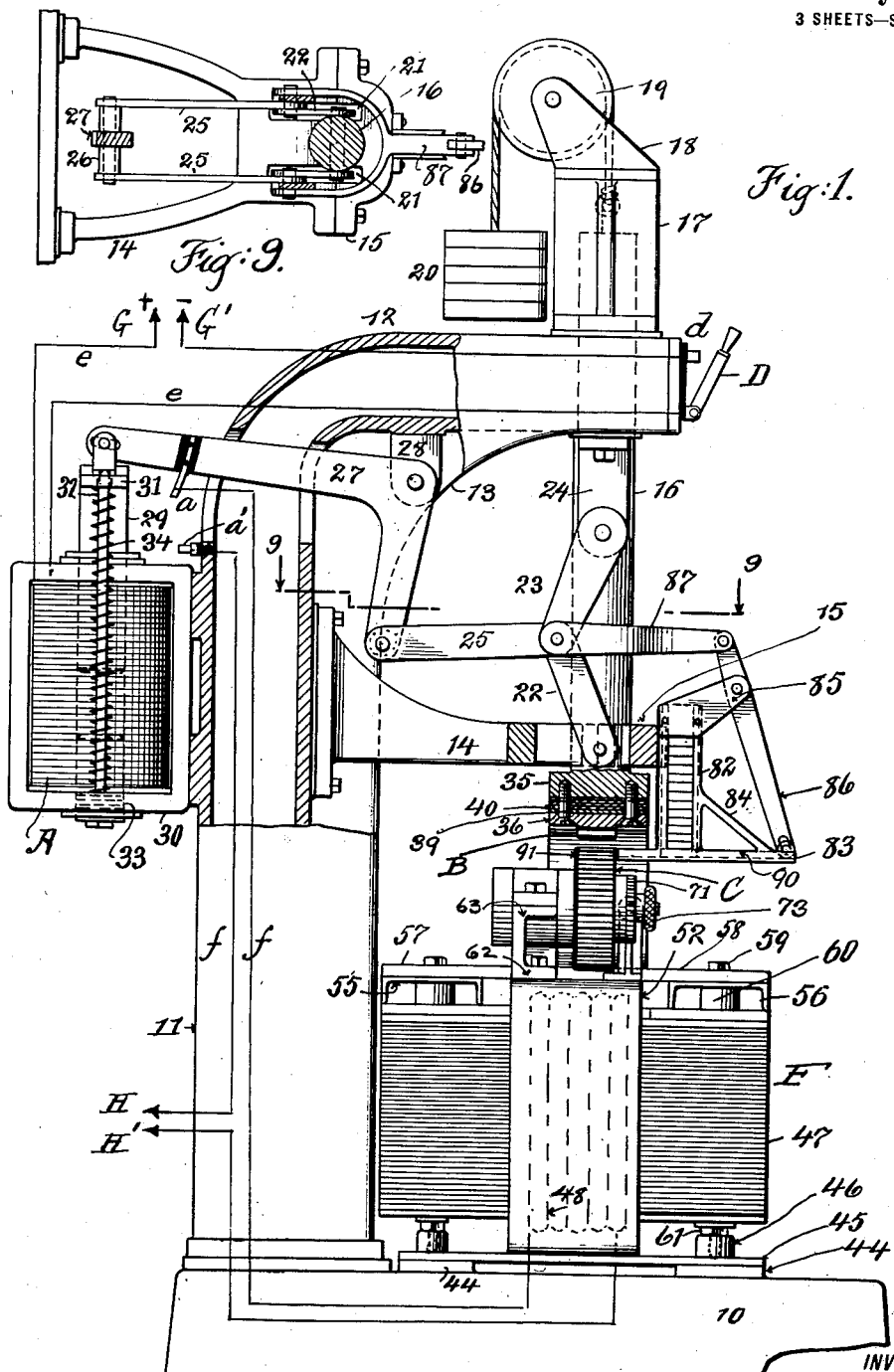
Figure 2:
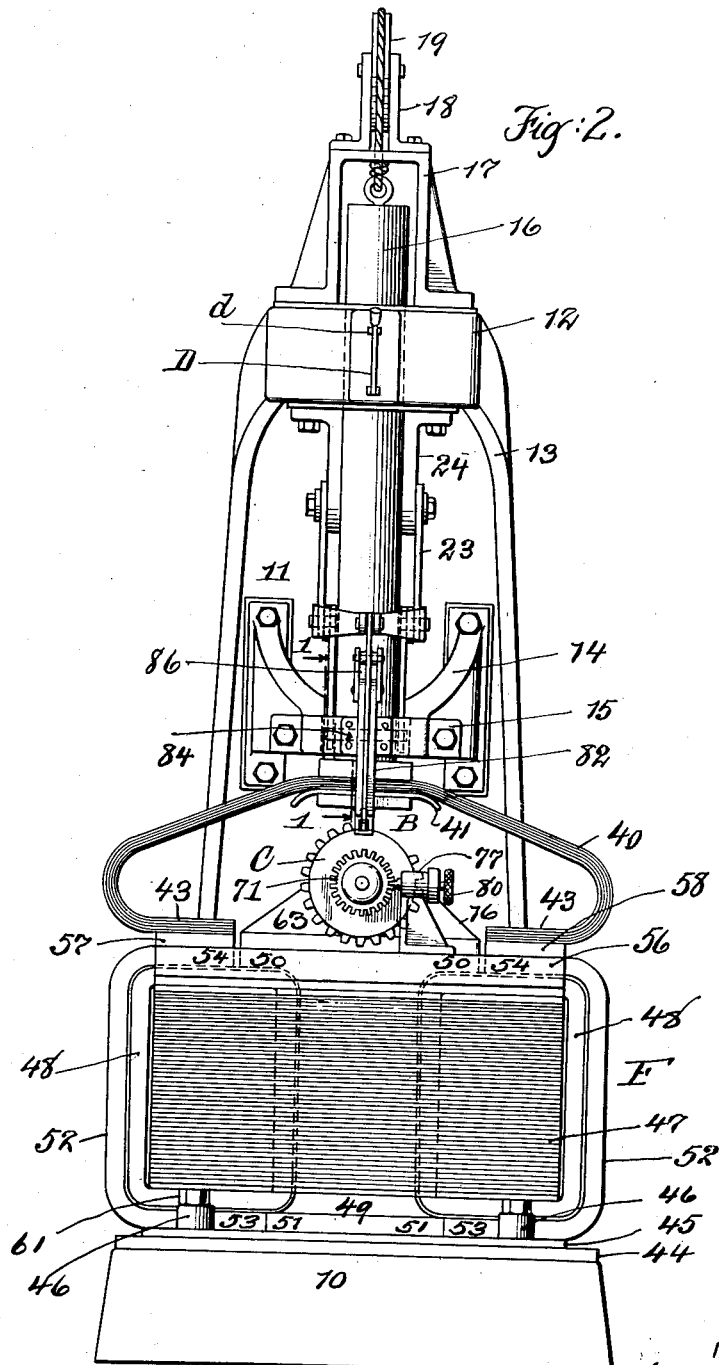

Figure 1 is a side elevation of our electric welding machine, showing a portion of the standard 11 in vertical section, and the parts at the lower end of rod 16 also in section on the line 1, 1 of Fig. 2. Fig. 2 is a front elevation of the machine. Fig. 3 is an enlarged section on the line 3, 3 of Fig. 4, showing the supporting and adjusting devices for the pulley, on the rim of which the gear teeth are welded. Fig. 4 is an elevation of the parts shown in Fig. 3, taken in the direction of the arrow in said figure. Fig. 5 is a front elevation of a portion of the pulley C, the feed chute 82 and tray 83, and the lever 86 for operating the pusher rod 90. Fig. 6 is a similar view, with the upper portion of the chute, the pusher rod, and the operating lever therefor removed. Fig. 7 is a front elevation of a portion of the pulley and teeth thereon, the plate 36 and the grooved projection B on said plate, the said projection being shown in holding and pressing engagement with one of the teeth. Fig. 8 is a section on the line 8, 8 of Fig. 5. Fig. 9 is a section on the line 9, 9 of Fig. 1.

Similar letters and numbers of reference indicate like parts.

*The frame and mechanism for operating the holding and pressing device.*

On the base 10 is a standard 11 having a horizontal arm 12 supported by side webs 13. On the front wall of standard 11 is a two-armed bracket 14 having a cap 15 and an opening for the reception of the vertical presser rod 16 and certain toggle arms hereafter described. On the arm 12 is a three-sided frame 17 which carries rearwardly inclined brackets 18, between which is journaled a pulley 19. A cord attached to an eye at the upper end of rod 16 passes over pulley 19 and carries a counterweight 20.

Pivoted to rod 16 on each side and entering parallel slots 21, Fig. 9, adjacent to the opening in bracket 14, through which said rod passes, are toggle arms 22, jointed to which are toggle arms 23, which at their upper ends are pivoted in brackets 24 depending from standard arm 12. Links 25 connected to the joints between arms 22 and 23 are united by a pin, Fig. 9, which carries a sleeve 26, to which is attached the short arm of a bell crank lever 27 pivoted in a bracket 28 on the lower side of arm 12.

The long arm of lever 27 extends through openings in standard 11, and is slotted near its extremity to receive a pin by which it is connected to the plunger core 29 of an electro-magnet A. Said magnet is received in a frame 30 which is secured to the rear wall of standard 11. On the core 29 are offsets 31, through which pass guide rods 32 which are supported on offsets 33 of frame 30. Helical retracting springs 34 surrounding rods 32 are interposed between the offsets 31 and 33.

On the lower end of rod 16 is an enlargement 35 and a plate 36 having a downward projection B, in which is a transverse groove 37 shaped to rest upon and receive a tooth 38, as shown in Fig. 7. Said projection B is one of the welding electrodes. Between enlargement 35 and plate 36 and secured by the screws 39 is a brush 40 formed of copper laminations. Between said brush and plate 36 is a bearing plate 41, Fig. 2. The brush is bent downwardly on each side of its support, and its end portions 43 are turned inward horizontally, as shown in Fig. 2.

The transformer.

This is generally indicated at F. On the base 10 are projections 44, Fig. 1, which support a copper plate 45 having upwardly projecting lugs 46. 47 is the laminated core of the transformer—here a quadrangular frame. The primary coil 48 incloses the core 47 in the usual way.

The secondary is in three parts, Fig. 2, namely, a middle member 49 having lateral projections 50, 51 at top and bottom, and two U-shaped side members 52. The middle member 49 and the lower arms 53 of said side members 52 rest upon copper plate 45. There are gaps between upper arms 54 of said side members and the top projections 50 of middle member 49.

Resting upon the core 47 are two parallel channeled bars 55, 56, Fig. 1, and resting upon said bars and upon the upper arms of secondary side members 52 are two flat bars 57, 58, with which the horizontal ends 43 of brush 40 make contact, Fig. 2. The bars 55, 56, 57, 58 form a rectangular frame, through the corners of which pass the headed fastening bolts 59. Said bolts extend down through lugs 60, Fig. 1, on the under side of bars 55, 56, through the core 47, and are received in the lugs 46 on plate 45. Above lugs 46, said bolts are threaded to receive nuts 61.

The work support and adjusting means.

As before stated, this machine is designed to weld a succession of gear teeth upon a support. Said support is here a pulley C, and the machine is accordingly organized to weld teeth on the rim of said pulley.

The means for holding the pulley in the machine during the welding operation is best shown in Figs. 3 and 4. A base plate 62 is secured upon the top of secondary member 49, and has integral with it a standard 63. In said standard is journaled a short shaft 64, threaded to receive a head 65, and at its other end having an integral disk E. Said disk is centrally recessed to receive the hub 67 of pulley C, and the rim 68 of said pulley incloses the circumferential periphery of said disk. The disk E is an electrode coöperating with the electrode B.

Fitting in said hub is a shaft 69. Said shaft 69 is secured to disk E by a threaded extension 70 entering a central recess in said disk. On shaft 69 is mounted a disk 71 having equidistantly spaced recesses 72 in its circumferential periphery. On the outer end of shaft 69 is a threaded extension which receives the operating knob 73. A keyway 74 is provided in shaft 69 to receive a key for securing said shaft to the hub and to the disk 71.

The gear teeth 38 of the usual form, as best shown in Figs. 5, 6, 7, are to be welded upon the rim 68 of pulley C, and are, therefore, made of a length equal to the width of said rim, as shown in Fig. 3. They may be equidistantly spaced around said rim. To permit of this spacing, the pulley C is mounted, as above described, so that it can be rotated by means of the knob 73. That is to say, after one tooth as 38*, Fig. 7, is affixed to the rim, the pulley is rotated by the knob 73 in the direction of the arrow, Fig. 7, over the distance which is to intervene between said affixed tooth and the next tooth 38 in succession. In this way, a new portion of the rim is presented for the attachment of each succeeding tooth.

In order that this distance may be exactly regulated, we provide a recessed disk 71, and with the recesses 72 in said disk there coöperates a pin 75, Fig. 4, which holds said disk and hence said pulley stationary after the pulley has been rotated over a desired interval and during the welding operation. The pin 75 is arranged as follows (see Fig. 4): Mounted on the middle secondary member 49 is a bracket 76 which carries a cylinder 77 having an opening in one end, through which passes said pin 75. Said pin is on the end of a rod 78 which extends through the threaded cap 79 of cylinder 77, and has a cross handle 80. On rod 78 is a collar, upon which bears a setting out helical spring 81. In Fig. 4, the pin 75 is shown in engagement with a recess in disk 71, and the pulley C is then in position to receive a tooth 38 to be welded upon its rim. After the welding of this tooth is completed, the pin 75 is withdrawn from said recess, and the pulley is rotated by knob 73 until said pin can enter the next following recess in disk 71. The pulley is then again held stationary until another tooth is affixed, and this continues until all the teeth are welded in place on the pulley rim. As the recesses 72 in disk 71 are equally spaced, it follows, of course, that the teeth will be equally spaced upon the pulley rim; but, of course, the disk may be rotated so that the pin 75 may be caused to engage with, for example, every other recess 72, thus doubling the interval between the teeth on the pulley: or, if for any special purpose it is desired to produce a gear wheel with irregularly spaced teeth, this is easily provided for by permitting the pin 75 to engage only with such recesses on disk 71 as will insure the pulley being rotated over the desired irregular intervals.

The feeding mechanism.

This comprises a chute 82, Figs. 5, 6 and 8, in which the teeth are placed one above the other, and down which chute they descend by gravity upon a tray 83, from which tray they are slid longitudinally in a direction transverse to the rim and directly upon said rim. The vertical chute 82 is preferably integral with the horizontal tray 83, and is secured to the cap 15 of bracket 14 by flanges 84, Fig. 2, bolted to said cap. A stiffening strut 84* unites the chute and tray. On the upper end of the chute are two forwardly inclined brackets 85, Fig. 1, between which is pivoted a lever 86. The upper end of lever 86 is pivoted to a yoke-shaped member 87, the arms of which extend around rod 16 and are pivoted to the joints between toggle arms 22 and 23. The lower end of lever 86 is slotted at 88, Fig. 8, to receive a pin which passes through eyes in lugs 89 on the end of pusher rod 90 which rests on the bottom of tray 83. When the teeth are disposed one above the other, as shown at 38$^A$, 38$^B$, 38$^C$, etc., in Fig. 8, and the pusher rod 90 is retracted, the lowest tooth descends upon the tray just in front of the end of said rod 90. Hence when said rod moves forwardly, the tooth is caused to slide first upon the bottom of the tray 83, and then upon the pulley rim 68, until it takes its final position, as shown in Figs. 3 and 8.

In order that the tooth shall register at its ends accurately with said rim, we provide a ring 91, preferably of insulating material, secured to disk E, which ring forms a stop which is met by the tooth when in proper position.

In the bottom of the tray 83 is an elongated slot 92 which permits the lower end of the lever 86 to describe its arc-shaped path. The slot 88 in the end of said lever also permits of this movement without interference with the rectilinear travel of the pusher rod 90. This movement is against the resiliency of springs 34 and of the brush 40, which, as has been stated, always bears upon the bars 57, 58.

*The operation of the mechanism.*

Magnet A is connected in circuit by wires $e$ with switch lever D and coöperating contact $d$, and also with terminals G, G', to source of direct current. Lever D and contact $d$ are supported on and insulated from standard arm 12. The primary 47 of transformer F is connected in circuit by wires $f$ with contact $a$, supported on and insulated from lever 27, and with coöperating contact $a'$, supported on and insulated from standard 11, and also with terminals H, H', to source of alternating current.

The pulley C having been placed in position, as described, the switch D is closed. Magnet A being energized, moves rod 16 down, and also operates the feed lever 86 to push a tooth beneath the electrode B. The timing is to be such that said tooth shall meet the stop ring 91 before electrode B is seated on the tooth. By reason of the descent of the magnet core, contact $a$ on lever 27 meets contact $a'$, thus establishing circuit through the joint between pulley rim and tooth, and so welding said tooth to said rim. Switch D being now opened, magnet A is deënergized, and the resiliency of springs 34 and brush 40 returns the parts to normal condition. The operator then withdraws the pin 75 from the recess in disk 71, and by means of knob 73, rotates the pulley C to expose a new portion of the pulley rim ready to receive the next tooth. The pulley is then again held stationary by the engagement of pin 75 in another recess of disk 71, and the operation so proceeds until all of the teeth are united to the pulley rim.

We claim:

1. A machine for electrically welding gear teeth, comprising a support for said teeth, an electrode fixed in position receiving said support, a movable electrode, and means for moving said teeth into position upon said support and between the same and said movable electrode.

2. A machine for electrically welding gear teeth as in claim 1, and mechanism for actuating said movable electrode after said teeth have been moved into welding position to press said teeth against said support.

3. A machine for electrically welding gear teeth as in claim 1, the said support being a circular disk forming a pulley body, and the said moving means being constructed to move said teeth into welding position upon and transversely across the rim of said body.

4. A machine for electrically welding gear teeth as in claim 1, comprising also a receptacle for said teeth, wherefrom said teeth are fed successively to said moving means, and means for moving said support over successive intervals to expose new portions thereof for the reception of said teeth.

5. A machine for electrically welding gear teeth as in claim 4, comprising means coöperating with said means for moving said support over successive intervals, for regulating the length of said intervals.

6. A machine for electrically welding gear teeth upon a support, comprising an electromagnet, and mechanism actuated by said magnet and timed and operating, first, to move a gear tooth into position upon said support, second, to clamp said tooth in place, and third, to establish welding current between said tooth and said support.

7. An electrical welding machine, comprising a vertically movable electrode, a fixed electrode below said movable electrode and carrying one of the bodies to be welded, an electro-magnet for moving said first-named electrode, and means actuated by said magnet for moving the other of said bodies to be welded into position upon said first-named body.

8. An electrical welding machine for uniting teeth to pulley rims, comprising a rotatable electrode entering said pulley, a support movable in a direction radial to said pulley, an electrode on said support coöperating with said rotatable electrode, and means for feeding a tooth upon said pulley rim and between said rim and said movable electrode.

9. An electrical welding machine for uniting teeth to pulley rims, comprising a base, a bracket thereon, a horizontal shaft journaled in said bracket, a rotatable disk electrode carried by said shaft and receiving the pulley body, a chute receiving teeth to be welded to said pulley rim, a tray receiving said teeth by gravity from said chute, means for moving said teeth successively from said tray to said pulley rim, and a movable electrode for holding said teeth in position on said rim.

10. An electrical welding machine, comprising a transformer, said transformer comprising a secondary having a middle member and two side members, said side members being electrically connected to said middle member at corresponding extremities, an electrode on said middle member, a second and movable electrode coöperating with said first-named electrode, and means for supporting the objects to be welded between said electrodes.

11. An electrical welding machine, comprising a transformer, said transformer comprising a secondary having a middle member and two side members, said side members being electrically connected to said middle member at corresponding extremities, an electrode on said middle member, a movable support, a second electrode on said support, a resilient contact carried by said support and coöperating with a secondary side member, and means for supporting the objects to be welded between said electrodes.

In testimony whereof we have affixed our signatures in presence of two witnesses.

THOMAS E. MURRAY.
HARRY R. WOODROW.

Witnesses:
GERTRUDE T. PORTER,
MAY T. McGARRY.